(12) United States Patent
Fuchs et al.

(10) Patent No.: US 8,975,563 B2
(45) Date of Patent: Mar. 10, 2015

(54) METHOD AND APPARATUS FOR THE CONTAMINATION-FREE HEATING OF GASES

(75) Inventors: Paul Fuchs, Schalchen (AT); Dieter Weidhaus, Burghausen (DE)

(73) Assignee: Wacker Chemie AG, Munich (DE)

( * ) Notice: Subject to any disclaimer, the term of this patent is extended or adjusted under 35 U.S.C. 154(b) by 1751 days.

(21) Appl. No.: 11/852,613

(22) Filed: Sep. 10, 2007

(65) Prior Publication Data

US 2008/0061057 A1 Mar. 13, 2008

(30) Foreign Application Priority Data

Sep. 12, 2006 (DE) .......................... 10 2006 042 685

(51) Int. Cl.
*H05B 6/64* (2006.01)
*B01J 8/18* (2006.01)

(52) U.S. Cl.
CPC ........ *B01J 8/1836* (2013.01); *B01J 2208/0046* (2013.01)
USPC .......................................... 219/759; 422/139

(58) Field of Classification Search
CPC ..................... B01J 8/1836; B01J 2208/0046
USPC ................. 219/759, 775, 701, 710, 679, 762;
422/139, 140, 143, 145, 146, 198, 199,
422/202; 165/177, 178, 180, 185, 186
See application file for complete search history.

(56) References Cited

U.S. PATENT DOCUMENTS

| | | | |
|---|---|---|---|
| 4,743,750 A | 5/1988 | Komatsu et al. | |
| 4,992,245 A * | 2/1991 | Van Slooten et al. | 422/146 |
| 5,014,339 A | 5/1991 | Tattermusch | |
| 5,165,908 A | 11/1992 | Van Slooten et al. | |
| 5,216,034 A * | 6/1993 | Sie | 518/706 |
| 5,374,413 A * | 12/1994 | Kim et al. | 423/349 |
| 6,039,894 A * | 3/2000 | Sanjurjo et al. | 252/301.4 R |
| 6,827,786 B2 | 12/2004 | Lord et al. | |
| 7,029,632 B1 | 4/2006 | Weidhaus et al. | |
| 2006/0057060 A1* | 3/2006 | Sun et al. | 423/651 |
| 2008/0190851 A1 | 8/2008 | Muller | |

FOREIGN PATENT DOCUMENTS

| | | |
|---|---|---|
| DE | 39 10 343 A1 | 10/1989 |
| DE | 36 12 814 C2 | 5/1991 |
| DE | 199 48 395 A1 | 5/2001 |
| DE | 103 55 785 B3 | 6/2005 |
| EP | 0 294 047 A1 | 12/1988 |

(Continued)

OTHER PUBLICATIONS

U.S. 5,165,908 is corresponding to WO 2007/057314 A1.

(Continued)

*Primary Examiner* — Quang Van
(74) *Attorney, Agent, or Firm* — Brooks Kushman P.C.

(57) ABSTRACT

A method for the contamination-free heating of a highly pure gas to a temperature of from 300 to 1200° C. involves passing the highly pure gas at a pressure of from 0.1 to 10 bar abs. over a highly pure solid which does not contaminate the gas, the solid being present in a highly pure container whose wall consists of a material which has a transparency of more than 85% for infrared rays and the container being irradiated by means of the infrared rays, the solid being heated thereby and the solid heating the gas.

12 Claims, 1 Drawing Sheet

(56) References Cited

FOREIGN PATENT DOCUMENTS

| | | | |
|---|---|---|---|
| EP | 0322627 | A | 7/1989 |
| JP | 01297139 | A | 11/1989 |
| JP | 07265689 | A | 10/1995 |
| JP | 2000146412 | A | 5/2000 |
| JP | 2001146412 | A | 5/2001 |
| WO | 2006084585 | A | 8/2006 |
| WO | 2007057314 | A1 | 5/2007 |

OTHER PUBLICATIONS

U.S. 7,029,632 B1 corresponds to DE 199 48 395 A1.
U.S. 4,743,750 corresponds to DE 36 12 814 C2.
Patbase Abstract corresponding to DE 103 55 785 B3.

* cited by examiner

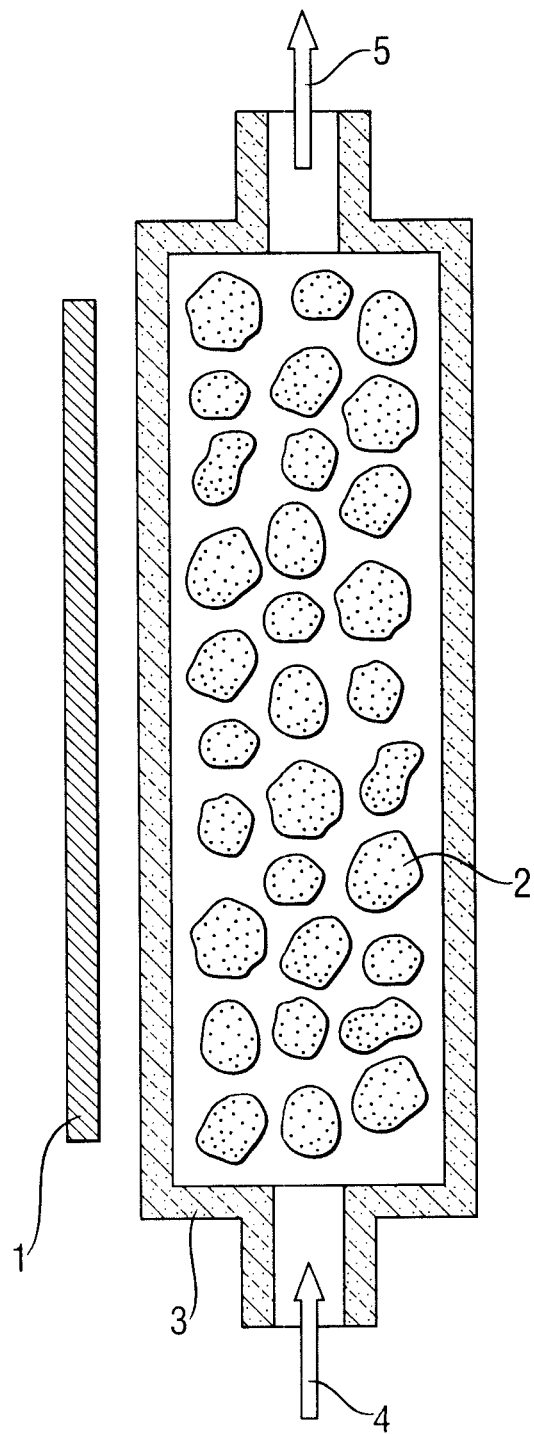

METHOD AND APPARATUS FOR THE CONTAMINATION-FREE HEATING OF GASES

BACKGROUND OF THE INVENTION

1. Field of the Invention

The invention relates to a method and an apparatus for the contamination-free heating of gases.

2. Background Art

In the fluidized-bed deposition of highly pure polycrystalline silicon, a bed of silicon particles is initially introduced into a reactor, and this bed is fluidized by a gas and heated by a suitable apparatus to the temperature necessary for the deposition reaction. The silicon-containing compound present in the gas, in general a silane or a halosilane ($SiH_aX_{4-a}$, X=halogen a=1-3), decomposes on the hot particle surfaces in a pyrolysis reaction with formation of elemental silicon which is deposited on the surface of the silicon particles and leads to a growth in the size of the particles. The method can be operated continuously if continuously growing particles are removed as product from the fluidized bed and particles of smaller size, so-called silicon seed particles, are fed to the fluidized bed. Such a method is described by way of example in DE 199 48 395 A1.

In these methods, the net heat demand of the fluidized bed is for the most part obtained from the difference between fluidized bed temperature and temperature of the gases fed in, whereas the enthalpy of reaction of the gas-phase deposition is of minor importance. The fluidized bed temperature corresponds to the required reaction temperature for the pyrolysis reaction and depends to a greater extent on the type and concentration of the silicon-containing compound. With the use of silane or chlorosilanes, e.g. trichlorosilane, a silicon-free gas, such as, for example, hydrogen, is usually also used for dilution. The minimum fluidized bed temperature for the deposition reaction increases greatly, starting from silane, with increasing chlorine content of the silicon-containing compound, and is from about 500° C. to 1200° C.

It is beneficial to preheat the gases to the fluidized bed temperature before entry into the fluidized bed and thus to keep the heat demand for the fluidized bed low. However, such preheating in the case of silicon-containing gases or gas mixtures which contain these compounds is limited by the respective decomposition temperature of the silicon-containing gases. If the silicon-free diluent gas, e.g. hydrogen, flows separately into the fluidized bed, this could theoretically be heated even above a fluidized bed temperature in order to heat the fluidized bed thereby. Particularly at very high temperatures, however, there is the danger of potential contamination by the apparatus for preheating, both in the case of the preheating of the silicon-containing gas and in the case of the preheating of the silicon-free diluent gas. This is true, for example, with the use of metallic heating elements comprising, for example, tantalum, molybdenum or Kanthal alloy, as described in U.S. Pat. No. 6,827,786 B2, column 18, line 57 et seq., for the preheating of hydrogen to 1300° C. for the fluidized-bed deposition. Disadvantageously, contamination of the gas occurs as a result of the intimate contact with the surface of the heating elements. The surface of the heating elements consists of metal which contaminates the gas to be heated. In addition, further contamination of the gas to be heated occurs as a result of the impurities present in the metal of the heating elements. The degree of contamination of the gas increases with increasing temperature of the metallic heating elements.

SUMMARY OF THE INVENTION

It was an object of the invention to provide a method for the contamination-free heating of highly pure gases, preferably of gases which are used for the fluidized-bed deposition of highly pure polycrystalline silicon, to a temperature of from 300 to 1200° C. These and other objects are achieved by a method wherein the highly pure gas is passed at a pressure of from 0.1 to 10 bar abs. over a highly pure solid which does not contaminate the gas and does not react with the gas, the solid being present in a highly pure container whose wall consists of a material which has a transparency of more than 85% for infrared rays, and the container being irradiated by means of the infrared rays, the solid being heated thereby, and the solid then heating the gas. An apparatus suitable for use in the process is also disclosed.

BRIEF DESCRIPTION OF THE DRAWINGS

FIG. 1 illustrates one embodiment of an apparatus suitable for use in the method of the invention.

DETAILED DESCRIPTION OF THE PREFERRED EMBODIMENTS

In the context of the invention, a highly pure gas is to be understood as meaning that the gas contains less than 10 ppm (volume) as the sum of all secondary constituents (impurities). For example, in the case of highly pure hydrogen, the secondary constituents are as a rule carbon monoxide, carbon dioxide, hydrocarbons, nitrogen, noble gases (as a rule Ar or He), oxygen and moisture ($H_2O$).

In the context of the present invention, a gas is not contaminated even when constituents of the solid are released into the gas, but do not adversely affect a subsequent reaction in which the gas is present, i.e. do not contaminate the reaction product of the subsequent reaction. Most preferably, a gas is not contaminated if no constituents of the solid are released to the gas.

The solid is preferably silicon which has less than 100 ppm (weight) of impurities in total, SiC which has less than 100 ppm (weight) of impurities in total, or $Si_3N_4$ which has less than 100 ppm (weight) of impurities in total. Most preferably, the solid is highly pure polycrystalline silicon.

The solid is heated by means of one or more radiant heaters. Preferably, a plurality of radiant heaters is uniformly distributed over the circumference of the container in order to achieve an input of heat energy which is as uniform as possible. The temperature and hence the wavelength of the radiant heater is chosen so that 85% or more of the radiant energy passes through the container wall and is converted to heat in the solid and 15% or less of the radiant energy is absorbed by the container wall. The heating of the gases takes place at a pressure of from 0.1 to 10 bar abs., preferably at a pressure of from 1 to 10 bar abs.

Preferably, the method is suitable for preheating gases for the fluidized-bed deposition of highly pure polycrystalline silicon. Such gases are, for example, silane, halosilanes, in particular chlorosilanes such as trichlorosilane, a silicon-free gas which can serve as a carrier gas in the fluidized-bed deposition such as hydrogen, and mixtures of these gases.

In one preferred embodiment, highly pure polycrystalline silicon in the form of granules or fragments is preferably used as the solid. The gas, preferably pure hydrogen or a mixture of hydrogen and trichlorosilane, is heated to a temperature of from 300° C. to 1200° C. (pure hydrogen) or to 300° C. to 400° C. (mixture of hydrogen and trichlorosilane). Preferably, from 50 to 500 m³/h of gas is passed through the container filled with silicon fragments or silicon granules.

The inventive method makes it possible to heat silicon-containing gases or gas mixtures which contain a silicon-containing gas to close to the decomposition temperature of the silicon-containing compound without contamination. Silicon-free gases, such as, for example, hydrogen, can be heated by the method even to above the required fluidized-bed temperature, up to 1200° C., without contamination.

A further object of the invention was to provide an apparatus which is suitable for carrying out the method according to the invention. This object is achieved by an apparatus comprising a container having an inlet orifice for a gas and an outlet orifice for the heated gas and radiant heaters which can irradiate the container with infrared rays, the container consisting of a highly pure material which does not contaminate the gas and which has more than 85% transparency for the infrared rays, the container being filled with the highly pure solid which does not contaminate the gas, it being possible to heat the solid by means of the infrared rays.

The solid is preferably present in the form of granules, shaped articles or fragments. The container is preferably filled with the solid granules, fragments or shaped articles so completely that the solid is immobile in the container and the gas to be heated can flow around the solid. The solid consists of a highly pure material which does not contaminate the gas and does not react with the gas. For heating hydrogen or mixtures of hydrogen and chlorosilanes, as is necessary for the fluidized-bed deposition of highly pure polycrystalline silicon, silicon, SiC or $Si_3N_4$, which in each case has less than 100 ppm (weight) of impurity in total, is used. The solid is most preferably highly pure polycrystalline silicon. In the context of the invention, highly pure polycrystalline silicon is preferably understood as meaning polycrystalline silicon which contains not more than 100 ppbw of metallic impurities, 1000 ppba of carbon, 5 ppba of acceptors (especially boron and aluminum) and 2 ppba of donors (especially phosphorus and arsenic).

Preferably, the container has a volume of from 0.01 to 0.1 m³. The container is preferably a vessel comprising quartz glass, preferably quartz glass of semiconductor quality, such as, for example, HSQ-300 from Heraeus. The vessel preferably has a shape of a cylinder or tube, the radiant heater then being arranged on the outside. In another embodiment, the container is the interior between two concentric cylinders or tubes. In this embodiment, the solid is present in the space between the inner and the outer cylinder or tube. In this embodiment, the infrared radiator is arranged inside the inner cylinder or tube and/or outside the outer cylinder or tube.

Infrared radiators having a heating coil temperature from 800 to 2700° C., preferably from 1500 to 2700° C., more preferably from 1800 to 2700° C., are preferably used as radiant heaters. At temperatures greater than 2000° C., about 90% of the radiant power is in the wavelength range from 0.3 to 3 μm. At these wavelengths, not more than 10% of the radiant power is converted into heat in the quartz tube in the case of a quartz tube of, for example, 5 mm thickness. The greater proportion of about 90% (wavelength from 0.3 to 3 μm) passes through the quartz tube without loss and is converted into heat in the solids to be heated. Preferably, an individual radiant heater has a radiant power of from 0.5 to 10 kW.

The container size, the installed heating power and the shape and size of the solid can be adapted to the respective throughput of gas and the required final temperature of the gas. The connection of a plurality of gas heaters according to the invention in series or parallel is also possible.

FIG. 1 shows an embodiment of the apparatus according to the invention for gas heating as a sectional view through the container. An infrared radiator (1) is present outside the quartz glass wall (3) of a container which separates the fragments of highly pure polycrystalline silicon (2) from the infrared radiator (1). The highly pure gas preferably flows from below (4) into the quartz glass container. On the opposite side (5), the heated gas flows away.

The following example serves for further illustrating the invention:

A bed of 15.6 kg of ultrapure silicon fragments having a size of from 15 mm to 30 mm was initially introduced into a quartz glass tube having an internal diameter of 114 mm. A plurality of short-wave IR lamps (coil temperatures from 1800 to 2400° C.) having a maximum total power of 26 kW are arranged around the quartz tube. A throughput of 75 m³ (S.T.P)/h of ultrapure hydrogen, which flowed into the quartz tube at a temperature of 120° C., was established through the bed. The system pressure was 2.9 bar absolute. The infrared radiators were powered up stepwise to maximum power. The hydrogen flowing away from the quartz tube reached 936° C. as the final temperature. The hydrogen thus preheated was fed to a fluidized-bed reactor for the production of polycrystalline ultrapure silicon granules. By preheating the hydrogen, it was possible to reduce the reactor heating by 21 kW. On the basis of the quality of the silicon granules produced, it was possible to rule out any negative influence of the gas preheating on the production of polycrystalline ultrapure silicon granules.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for the contamination-free preheating of a highly pure gas prior to introducing the heated gas into a reactor, comprising passing highly pure gas at a pressure of from 0.1 to 10 bar abs over a highly pure solid which does not contaminate the gas and does not react with the gas, the solid being present in a highly pure container whose wall has a transparency of more than 85% for infrared rays and the container being irradiated by means of the infrared rays, the solid being heated thereby and the solid heating the gas to form a heated gas having a temperature of from 300° C. to 1200° C., the container being filled with the highly pure solid, which comprises granules, fragments or shaped articles, such that the solid is immobile in the container and the gas to be heated can flow around said solid.

2. The method of claim 1, wherein the solid is selected from the group consisting of silicon, SiC, $Si_3N_4$, and mixtures thereof, wherein the solid has less than 100 ppm (weight) of impurities in total.

3. The method of claim 1, wherein highly pure polycrystalline silicon is used as the solid.

4. The method of claim 3, wherein the gas to be heated is hydrogen, and the gas is heated to a temperature in the range from 300° C. to 1200° C.

5. The method of claim 3, wherein the gas to be heated is a mixture of hydrogen and trichlorosilane, and the mixture is heated to a temperature in the range from 300° C. to 400° C.

6. The method of claim 1, wherein the method is carried out at a pressure of from 1 to 10 bar abs.

7. The method of claim 1, wherein the gas to be heated is a gas selected from the group consisting of silane, halosilane, hydrogen, and mixtures thereof.

8. The method of claim 1, wherein from 50 to 500 $m^3/h$ of gas is passed through the container.

9. The method of claim 1, further comprising introducing the heated gas into a reactor.

10. The method of claim 9, wherein the reactor is a fluidized bed reactor for deposition of silicon.

11. The method of claim 1, wherein the gas to be heated comprises a mixture of hydrogen and at least one of a silane or chlorosilane, the gas is heated to a temperature below the decomposition temperature of the silane and chlorosilane, further comprising introducing the heated gas into a fluidized bed reactor for deposition of silicon, the reaction temperature of the fluidized bed in the fluidized bed reactor being in the range of 500° C. to 1200° C., wherein the heated gas introduced into the reactor lowers the amount of heat supplied to maintain the reaction temperature of the fluidized bed.

12. The method of claim 1, further comprising conveying the heated gas to a fluidized bed reactor wherein silicon metal is deposited by decomposition of the silane or chlorosilane.

* * * * *